US008875278B2

(12) United States Patent
Bennah et al.

(10) Patent No.: US 8,875,278 B2
(45) Date of Patent: *Oct. 28, 2014

(54) DYNAMIC ALLOCATION OF NETWORK SECURITY CREDENTIALS FOR ALERT NOTIFICATION RECIPIENTS

(75) Inventors: Albert D. Bennah, Cary, NC (US); David J. Rudda, Jr., Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 88 days.

This patent is subject to a terminal disclaimer.

(21) Appl. No.: 13/524,016

(22) Filed: Jun. 15, 2012

(65) Prior Publication Data

US 2013/0159794 A1 Jun. 20, 2013

Related U.S. Application Data

(63) Continuation of application No. 13/331,374, filed on Dec. 20, 2011.

(51) Int. Cl.
 *H04L 29/06* (2006.01)
 *G06F 11/07* (2006.01)

(52) U.S. Cl.
 CPC ........ *H04L 63/0272* (2013.01); *G06F 11/0709* (2013.01)
 USPC ............................................. 726/15; 714/57

(58) Field of Classification Search
 CPC . H04L 63/0272; H04L 29/14; H04L 43/0817; G06F 11/327; G06F 11/0709; G06F 11/0793
 USPC ............................................. 726/15; 714/57
 See application file for complete search history.

(56) References Cited

U.S. PATENT DOCUMENTS

| 6,704,874 | B1* | 3/2004 | Porras et al. .................... 726/22 |
| 7,694,115 | B1* | 4/2010 | Porras et al. ...................... 713/1 |
| 8,443,439 | B2* | 5/2013 | Lamastra et al. ............... 726/22 |
| 2005/0075842 | A1 | 4/2005 | Ormazabal et al. |
| 2005/0216781 | A1 | 9/2005 | Doshi et al. |
| 2006/0070128 | A1 | 3/2006 | Heimerdinger et al. |

(Continued)

OTHER PUBLICATIONS

IBM, "Method and System to Detect Network Security Problems in a Bladecenter Environment and Report an Alert to a Network Administrator", IP.com Prior Art Database, Apr. 2008, pp. 1-4, IP.com No. IPCOM000169639D, IP.com.

(Continued)

*Primary Examiner* — Michael S McNally
(74) *Attorney, Agent, or Firm* — Edward J. Lenart; Katherine S. Brown; Biggers Kennedy Lenart Spraggins LLP

(57) ABSTRACT

Methods, apparatuses, and computer program products for dynamic allocation of network security credentials for alert notification recipients are provided. Embodiments include receiving from a managed system, by an alert management system, an alert indicating one of a failure in the managed system and a pending failure in the managed system; selecting, by the alert management system, a remote device from a plurality of remote devices registered for remote access with the alert management system; preapproving, by the alert management system, network security clearance of the selected remote device, the network security clearance for remote access to the management system via a virtual private network (VPN) interface; and transmitting to the selected remote device, by the alert management system, an alert notification that includes an internet address corresponding to the VPN interface.

6 Claims, 4 Drawing Sheets

(56) References Cited

U.S. PATENT DOCUMENTS

| | | | |
|---|---|---|---|
| 2006/0143702 A1* | 6/2006 | Hisada et al. | 726/15 |
| 2006/0143710 A1* | 6/2006 | Desai et al. | 726/23 |
| 2007/0118905 A1 | 5/2007 | Morin et al. | |
| 2007/0223917 A1* | 9/2007 | Nagamine | 398/1 |
| 2009/0109020 A1* | 4/2009 | Tischer | 340/539.13 |
| 2010/0235688 A1* | 9/2010 | Bennah et al. | 714/57 |

OTHER PUBLICATIONS

IBM, "Early Warning System for Internet-Based Security Alerting", IP.com Prior Art Database, Mar. 2004, pp. 1-3, IP.com No. IPCOM000022291D, IP.com.

Basso et al., "A Novel Architecture for Content and Delivery Validation for IPTV Systems", in 2010 7th IEEE Consumer Communications and Networking Conference (CCNC), Jan. 2010, 5 pp., Digital Object Identifier: 10.1109/CCNC.2010.5421619, IEEE Computer Society, Las Vegas, NV.

Consumer Electronics Association (CEA), "CEA Standards: Standards Details—J-STD-70 (ANSI/CEA-2035); Emergency Alert Metadata for the Home Network", www.ce.org [online] Apr. 2010, [accessed online Oct. 6, 2011] URL: http://www.ce.org/Standards/browseByCommittee_7434.asp.

Adobe, "About Metadata Tags", from Adobe Flex 3 Help—Custom Component Development, www.adobe.com [online], [accessed online Oct. 6, 2011] URL: http://livedocs.adobe.com/flex/3/html/help.html?content=metadata_2.html.

Microsoft, "Sharepoint 2007—Alerts Not Sending Column Metadata, But Merely the Default", from Microsoft SharePoint, Sharepoint Products, SharePoint Products and Technologies Forums, SharePoint—General Question and Answers and Discussion (pre-SharePoint 2010), http://technet.microsoft.com/en-us/ [online] Oct. 2008, [accessed online Oct. 6, 2011] URL: http://social.technet.microsoft.com/Forums/en/sharepointgeneral/thread/483418ce-2f70-411a-8597-ae93dbd67137.

Blumentals Software, "iNet Protector—Restrict Internet Access, Password Protect Internet Connection", www.blumentals.net [online], [accessed online Oct. 6, 2011] URL: http://www.blumentals.net/inetprot/.

\* cited by examiner

DYNAMIC ALLOCATION OF NETWORK SECURITY CREDENTIALS FOR ALERT NOTIFICATION RECIPIENTS

CROSS-REFERENCE TO RELATED APPLICATION

This application is a continuation application of and claims priority from U.S. patent application Ser. No. 13/331,374, filed on Dec. 20, 2011.

BACKGROUND OF THE INVENTION

1. Field of the Invention

The field of the invention is data processing, or, more specifically, methods, apparatuses, and computer program products for dynamic allocation of network security credentials for alert notification recipients.

2. Description of Related Art

Datacenters often contain complicated heterogeneous environments where many systems and components interact to achieve a specific goal. Many are behind firewalls, BSOs, and VPNs of various kinds for security reasons. When problems arise in the hardware or software stacks in these datacenters, system administrators often rely on various system management tools to alert them of these problems. Typical alert messages include information such as a description of the failure, affected system and other ancillary data. However, for a system administrator away from the managed datacenter, verifying the security clearance of the system administrator by the transmission of the security credentials may present further problems including additional security concerns.

SUMMARY OF THE INVENTION

Methods, apparatuses, and computer program products for dynamic allocation of network security credentials for alert notification recipients are provided. Embodiments include receiving from a managed system, by an alert management system, an alert indicating one of a failure in the managed system and a pending failure in the managed system; selecting, by the alert management system, a remote device from a plurality of remote devices registered for remote access with the alert management system; preapproving, by the alert management system, network security clearance of the selected remote device, the network security clearance for remote access to the management system via a virtual private network (VPN) interface; and transmitting to the selected remote device, by the alert management system, an alert notification that includes an internet address corresponding to the VPN interface.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
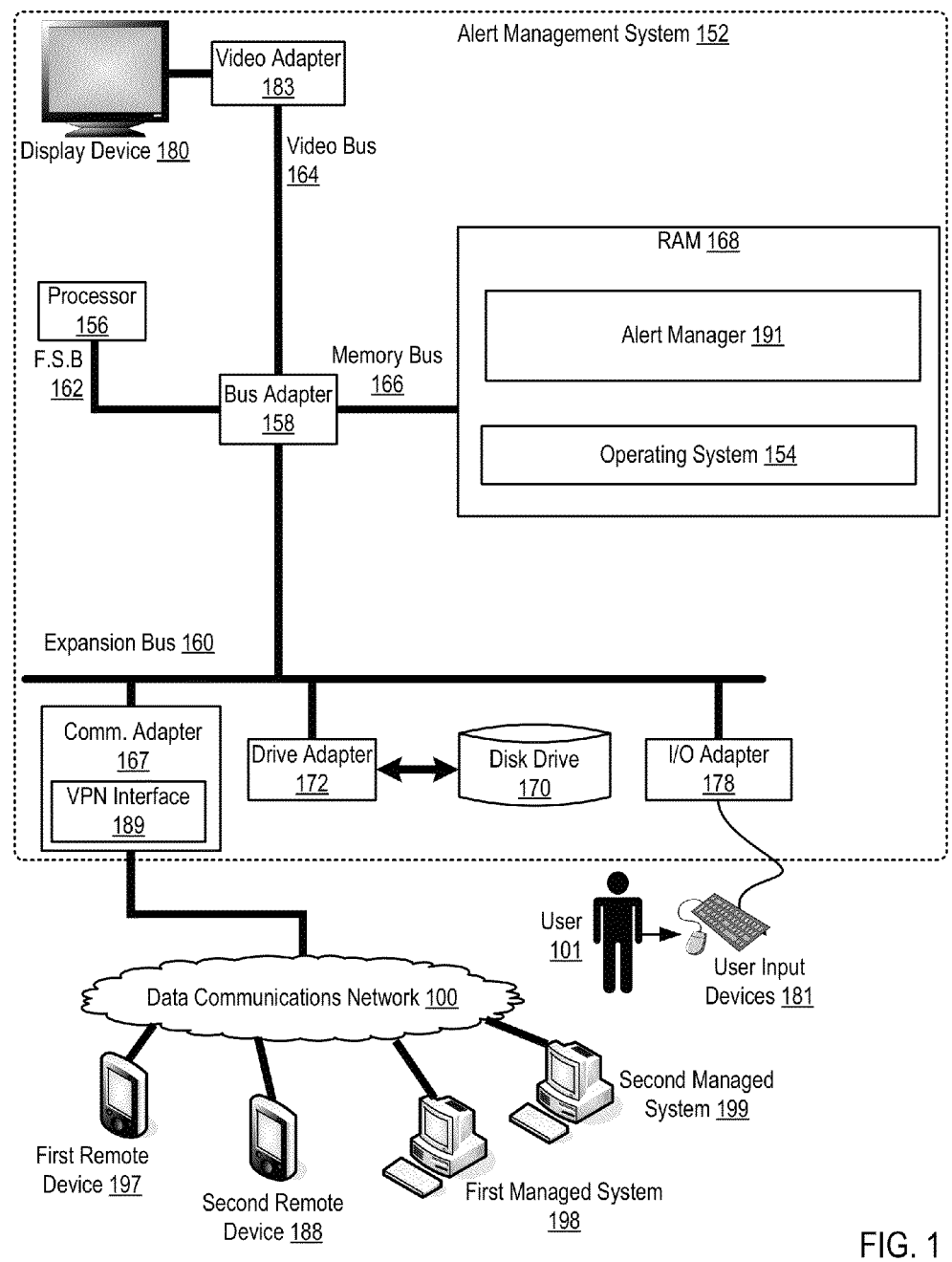
FIG. 1 sets forth a block diagram of automated computing machinery comprising an exemplary alert management system useful in dynamic allocation of network security credentials for alert notification recipients according to embodiments of the present invention.

Exemplary methods, apparatuses, and computer program products for dynamic allocation of network security credentials for alert notification recipients in accordance with the present invention are described with reference to the accompanying drawings, beginning with FIG. 1. Dynamic allocation of network security credentials for alert notification recipients in accordance with the present invention is generally implemented with computers, that is, with automated computing machinery. FIG. 1 sets forth a block diagram of automated computing machinery comprising an exemplary alert management system (152) useful in dynamic allocation of network security credentials for alert notification recipients according to embodiments of the present invention. The alert management system (152) of FIG. 1 includes at least one computer processor (156) or 'CPU' as well as random access memory (168) ('RAM') which is connected through a high speed memory bus (166) and bus adapter (158) to processor (156) and to other components of the alert management system (152).

Stored in RAM (168) is an alert manager (191) that includes computer program instructions for dynamic allocation of network security credentials for alert notification recipients. The alert manager (191) includes computer program instructions that when executed by the processor (156) cause the alert management system (152) to carry out the steps of: receiving from a managed system, an alert indicating one of a failure in the managed system and a pending failure in the managed system; selecting a remote device from a plurality of remote devices registered for remote access with the alert management system; preapproving network security clearance of the selected remote device, the network security clearance for remote access to the management system via a virtual private network (VPN) interface; and transmitting to the selected remote device, an alert notification that includes an internet address corresponding to the VPN interface.

The alert management system (152) provides an alert notification to a remote device so that a system administrator that is away from the managed system may access the managed system through a virtual private network (VPN) without having to provide security credentials. That is, the remote device is preapproved as the identity of the remote device serves as a form of security identity to the alert management system. Additional software on the remote device may present a user interface to the system administrator that requires the system administrator to verify his identity before the remote device presents an interface for connecting with the managed system. However, as explained above, the security credentials of the system administrator need not be transferred over the network (100) to the alert management system (152). By relying on the remote device to confirm identity of users' security credentials, security credentials may be dynamically allocated by preapproving the remote device for access to the managed system.

Also stored in RAM (168) is an operating system (154). Operating systems useful dynamic allocation of network security credentials for alert notification recipients according to embodiments of the present invention include UNIX™, Linux™, Microsoft XP™, AIX™, IBM's i5/OS™, and others as will occur to those of skill in the art. The operating system (154) and the alert manager (191) in the example of FIG. 1 are shown in RAM (168), but many components of such software typically are stored in non-volatile memory also, such as, for example, on a disk drive (170).

The alert management system (152) of FIG. 1 includes disk drive adapter (172) coupled through expansion bus (160) and bus adapter (158) to processor (156) and other components of the alert management system (152). Disk drive adapter (172) connects non-volatile data storage to the alert management system (152) in the form of disk drive (170). Disk drive adapters useful in computers for dynamic allocation of network security credentials for alert notification recipients according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example alert management system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example alert management system (152) of FIG. 1 includes a video adapter (183), which is an example of an I/O adapter specially designed for graphic output to a display device (180) such as a display screen or computer monitor. Video adapter (183) is connected to processor (156) through a high speed video bus (164), bus adapter (158), and the front side bus (162), which is also a high speed bus.

The exemplary alert management system (152) of FIG. 1 includes a communications adapter (167) for data communications with a first remote device (197), a second remote device (188), a first managed system (198), and a second managed system (199) and for data communications with a data communications network (100). Such data communications may be carried out serially through RS-232 connections, through external buses such as a Universal Serial Bus (USW), through data communications networks such as IP data communications networks, and in other ways as will occur to those of skill in the art. In addition, the communications adapter (167) includes a VPN interface for establishing a virtual private network between one of the remote devices (197, 198) and one of the managed systems (198, 199). Communications adapters implement the hardware level of data communications through which one computer sends data communications to another computer, directly or through a data communications network. Examples of communications adapters useful for dynamic allocation of network security credentials for alert notification recipients according to embodiments of the present invention include modems for wired dial-up communications, Ethernet (IEEE 802.3) adapters for wired data communications network communications, and 802.11 adapters for wireless data communications network communications.

Figure 2:
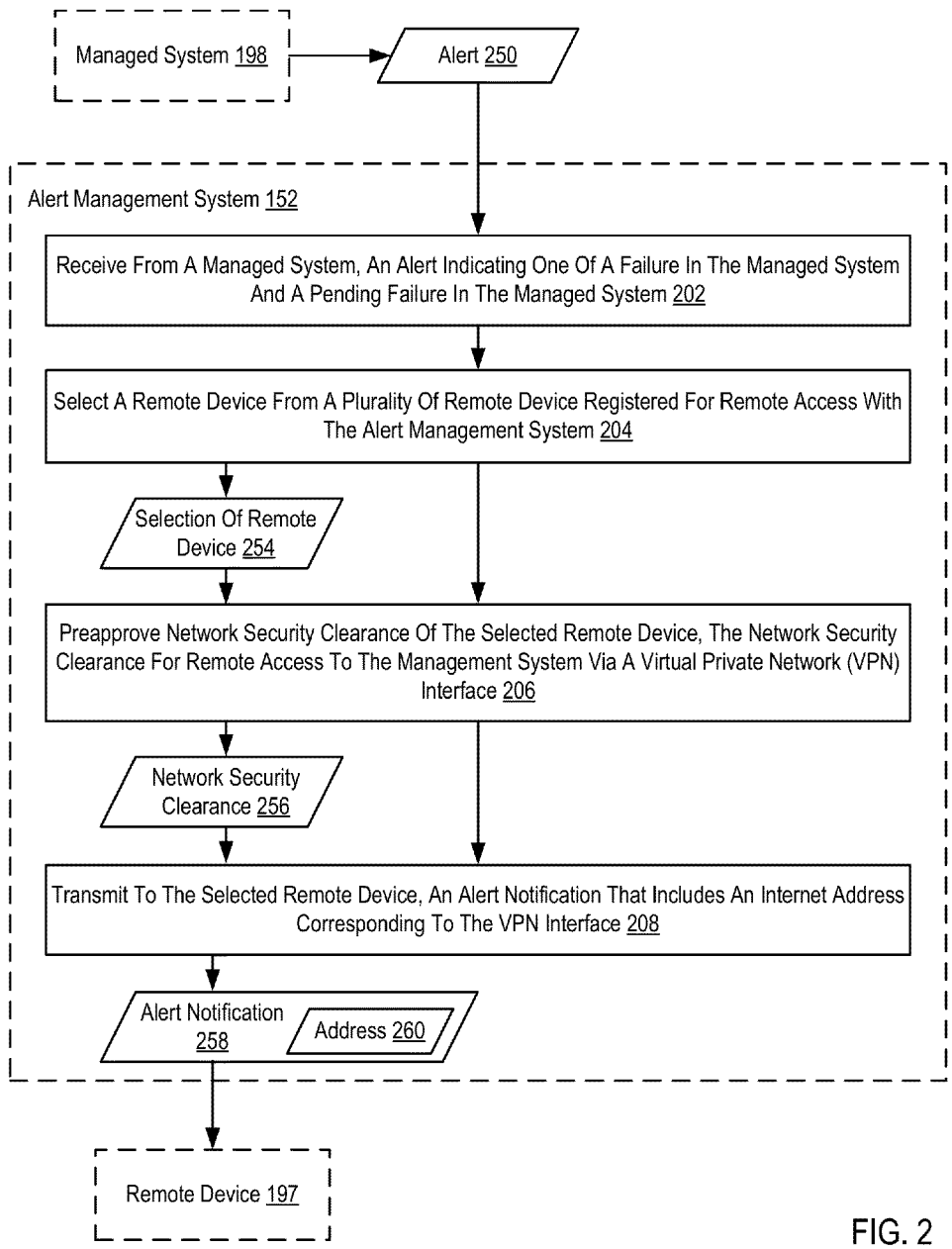
FIG. 2 sets forth a flow chart illustrating an exemplary method for dynamic allocation of network security credentials for alert notification recipients according to embodiments of the present invention.

For further explanation, FIG. 2 sets forth a flow chart illustrating an exemplary method for dynamic allocation of network security credentials for alert notification recipients according to embodiments of the present invention. The method of FIG. 2 includes receiving (202) from a managed system (198), by an alert management system (152), an alert (250) indicating one of a failure in the managed system and a pending failure in the managed system. Receiving (202) from a managed system (198), an alert (250) indicating one of a failure in the managed system and a pending failure in the managed system may be carried out by receiving data from a managed system indicating that one or more components of the managed system have failed or are predicted to fail.

The method of FIG. 2 includes selecting (204), by the alert management system (152), a remote device (197) from a plurality of remote devices (197, 188) registered for remote access with the alert management system (152). Selecting (204) a remote device (197) from a plurality of remote devices (197, 188) registered for remote access with the alert management system (152) may be carried out by querying a database storing associations of remote device identifications with managed systems; determining which remote device identifications are associated with the particular managed system that generated the alert; and storing an identifier indicating that the remote device corresponding with the remote device identification associated with the managed system is the selected remote device.

The method of FIG. 2 also includes preapproving (206), by the alert management system (152), network security clearance (256) of the selected remote device. The network security clearance (256) is a security credential that may specify a system administrator assigned to the selected remote device; the security level and scope of the system administer; and the capabilities and security level and scope of the remote device. Preapproving (206) network security clearance (256) of the selected remote device may be carried out by examining the security level and scope of a system administrator assigned the selected remote device; examining the capabilities and security level and scope of the selected remote device; and storing an indication within the alert management system so that the system administrator does not need to provide verification of security credentials along with a request for a VPN connection between the selected remote device and the managed system.

The method of FIG. 2 includes transmitting (208) to the selected remote device (197), by the alert management system (152), an alert notification (258) that includes an internet address (260) corresponding to the VPN interface (189). The alert notification is transmitted via a SMS message to the selected remote device. Transmitting (208) to the selected remote device (197), an alert notification (258) that includes an internet address (260) corresponding to the VPN interface (189) may be carried out by assigning an internet address to the VPN interface; and storing the assigned internet address to the alert notification.

Figure 3:
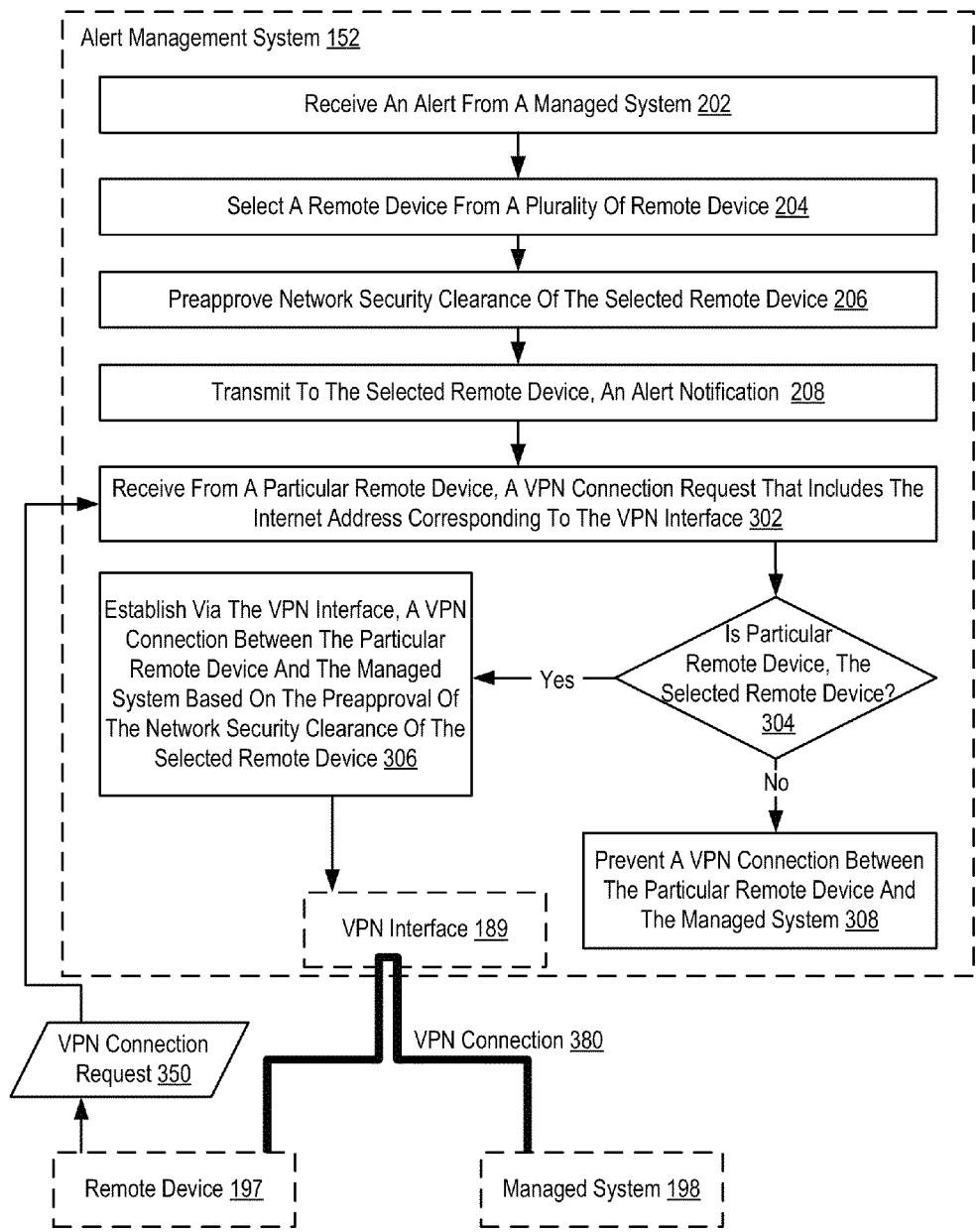
FIG. 3 sets forth a flow chart illustrating a further exemplary method for dynamic allocation of network security credentials for alert notification recipients.

For further explanation, FIG. 3 sets forth a flow chart illustrating a further exemplary method for dynamic allocation of network security credentials for alert notification recipients. The method of FIG. 3 is similar to the method of FIG. 2 in that the method of FIG. 3 includes receiving (202) from a managed system (198) an alert (250) indicating one of a failure in the managed system and a pending failure in the managed system; selecting (204) a remote device (197) from a plurality of remote devices (197, 188) registered for remote access with the alert management system (152); preapproving (206) network security clearance (256) of the selected remote device; transmitting (208) to the selected remote device (197), an alert notification (258) that includes an internet address (260) corresponding to the VPN interface (189).

The method of FIG. 3, however, also includes receiving (302) from a particular remote device (197), by the alert management system (152), a VPN connection request (350) that includes the internet address (260) corresponding to the VPN interface (189). Receiving (302) from a particular remote device (197), a VPN connection request (350) that includes the internet address (260) corresponding to the VPN interface (189) may be carried out by receiving a message that indicates the internet address (260).

The method of FIG. 3 also includes determining (304), by the alert management system (152), whether the particular remote device (197) is the selected remote device preapproved for remote access to the managed system (198) via the VPN interface (189) at the internet address (260). Determining (304) whether the particular remote device (197) is the selected remote device preapproved for remote access to the managed system (198) via the VPN interface (189) at the internet address (260) may be carried out by examining a storage location within the alert management system to determine if an identification of the particular remote device is associated with a managed system and the internet address of the VPN interface.

The method of FIG. 3 includes if the particular remote device (197) is the selected remote device, establishing (306) via the VPN interface (189), by the alert management system (152), a VPN connection (380) between the particular remote device (197) and the managed system (198) based on the preapproval of the network security clearance (256) of the selected remote device. Establishing (306) via the VPN interface (189), a VPN connection (380) between the particular remote device (197) and the managed system (198) based on the preapproval of the network security clearance (256) of the selected remote device may be carried out by enabling a user of the particular remote device to connect with the managed system. The method of FIG. 3 includes if the particular remote device (197) is not the selected remote device, preventing (308), by the alert management system (152), a VPN connection between the particular remote device (197) and the managed system (198). Preventing (308) a VPN connection between the particular remote device (197) and the managed system (198) may be carried out by disconnecting with the remote device; adding the remote device to a VPN block list; and transmitting one or more security alerts to a security firewall application.

Figure 4:
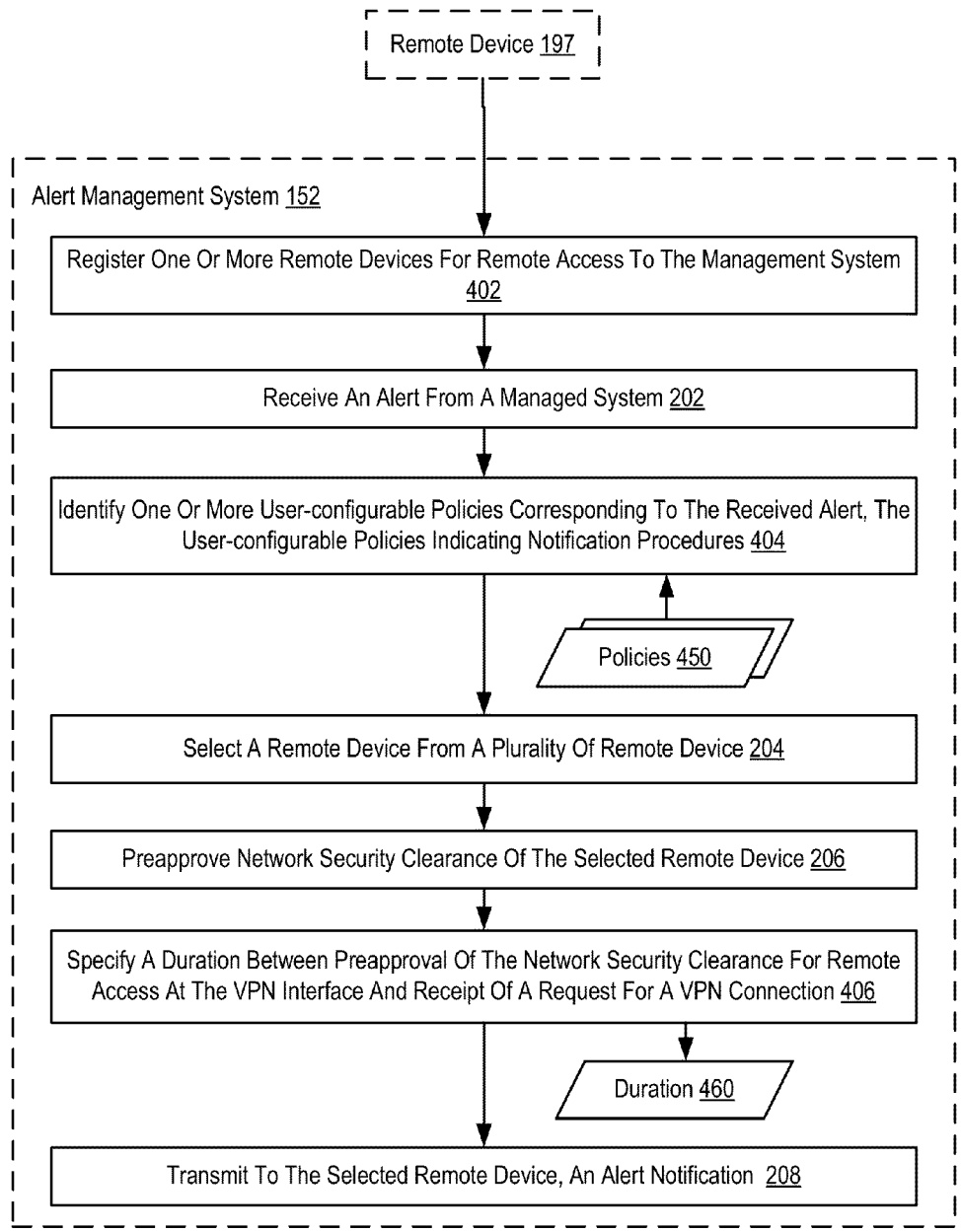
FIG. 4 sets forth a flow chart illustrating a further exemplary method for dynamic allocation of network security credentials for alert notification recipients.

For further explanation, FIG. 4 sets forth a flow chart illustrating a further exemplary method for dynamic allocation of network security credentials for alert notification recipients. The method of FIG. 4 is similar to the method of FIG. 2 in that the method of FIG. 4 also includes receiving (202) from a managed system (198) an alert (250) indicating one of a failure in the managed system and a pending failure in the managed system; selecting (204) a remote device (197) from a plurality of remote devices (197, 188) registered for remote access with the alert management system (152); preapproving (206) network security clearance (256) of the selected remote device; and transmitting (208) to the selected remote device (197), an alert notification (258) that includes an internet address (260) corresponding to the VPN interface (189).

The method of FIG. 4, however, also includes registering (402), by the alert management system (152), one or more remote devices (197) for remote access to the managed system (198). Registering (402) one or more remote devices (197) for remote access to the managed system (198) may be carried out by storing an identification of the one or more remote devices within the alert management system; storing an identification of a system administrator assigned to the one or more remote devices; and storing security parameters associated with the system administrator and the remote devices, including security scope and level of both the system administrator and the remote device.

The method of FIG. 4 also includes identifying (404), by the alert management system (152), one or more user-configurable policies (450) corresponding to the received alert (250). The user-configurable policies indicate notification procedures. Examples of notification procedures include what protocols to use when notifying an alert recipient; and which types of remote devices may receive alert notifications. Identifying (404) one or more user-configurable policies (450) corresponding to the received alert (250) may be carried out by identifying a managed system that transmitted the alert; and determining which user-configurable policies correspond with the identified managed system.

The method of FIG. 4 also includes specifying (406), by the alert management system (152), a duration (460) between preapproval of the network security clearance (256) for remote access at the VPN interface (189) and receipt of a request for a VPN connection. Specifying (406) a duration (460) between preapproval of the network security clearance (256) for remote access at the VPN interface (189) and receipt of a request for a VPN connection may be carried out by storing a value indicating an amount of time.

Exemplary embodiments of the present invention are described largely in the context of a fully functional computer system for dynamic allocation of network security credentials for alert notification recipients. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of dynamic allocation of network security credentials for alert notification recipients, the method comprising:
   receiving from a managed system, by an alert management system, an alert indicating one of a failure in the managed system and a pending failure in the managed system;
   selecting, by the alert management system, a remote device from a plurality of remote devices registered for remote access with the alert management system;
   preapproving, by the alert management system, virtual private network security clearance of the selected remote device, the virtual private network security clearance granting remote access to the managed system via a virtual private network (VPN) interface; and
   transmitting to the selected remote device, by the alert management system, an alert notification that includes an internet address corresponding to the VPN interface.

2. The method of claim 1 further comprising:
   receiving from a particular remote device, by the alert management system, a VPN connection request that includes the internet address corresponding to the VPN interface;
   determining, by the alert management system, whether the particular remote device is the selected remote device preapproved for remote access to the managed system via the VPN interface at the internet address;

if the particular remote device is the selected remote device, establishing via the VPN interface, by the alert management system, a VPN connection between the particular remote device and the managed system based on the preapproval of the network security clearance of the selected remote device; and if the particular remote device is not the selected remote device, preventing, by the alert management system, a VPN connection between the particular remote device and the managed system.

3. The method of claim 1 further comprising specifying, by the alert management system, a duration between preapproval of the network security clearance for remote access at the VPN interface and receipt of a request for a VPN connection.

4. The method of claim 1 further comprising registering, by the alert management system, one or more remote devices for remote access to the managed system.

5. The method of claim 1 further comprising identifying, by the alert management system, one or more user-configurable policies corresponding to the received alert, the user-configurable policies indicating notification procedures.

6. The method of claim 1 wherein the alert notification is transmitted via a SMS message to the selected remote device.

\* \* \* \* \*